3,414,635
HYDROXYALKYL ESTERS IN
SURFACE COATINGS
Gayle D. Edwards and Harold G. Waddill, Austin, Tex.,
assignors to Jefferson Chemical Company, Inc., Houston, Tex., a corporation of Delaware
No Drawing. Filed Oct. 18, 1965, Ser. No. 497,499
8 Claims. (Cl. 260—851)

This invention is concerned with the preparation of thermosetting surface coatings. More particularly, this invention is concerned with the preparation of thermosetting surface coatings prepared from novel hydroxyalkyl esters.

Since their introduction several years ago, thermosetting acrylic enamels have gained acceptance in the automotive industry, the major appliance market and in finishes for aluminum siding. The preparation of such enamels is described, for example, by Costanza and Waters, Offic. Dig. Federation Socs. Paint Technol., 37, 424 (1965) and Petropoulos, Frazier and Cadwell, Offic. Dig. Federation Socs. Paint Technol., 33, 719 (1961). Briefly, such an enamel is obtained by the copolymerization of a hydroxyalkyl ester of an unsaturated acid, such as hydroxypropyl methacrylate, with at least one ethylenically unsaturated compound, such as styrene and alkyl acrylates followed by subsequent cross-linking of the resin by heating the polymer with an amino-formaldehyde resin. The hydroxyalkyl acrylates and methacrylates of the prior art suffer from the disadvantage that the properties of the resin cannot be varied to any great extent by variation of the hydroxyalkyl group in the monomer.

We have now discovered that thermosetting surface coatings may be prepared using hydroxyalkyl esters of unsaturated acids corresponding to the formula:

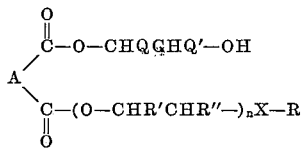

wherein A represents the nucleus of an ethylenically unsaturated dicarboxylic acid, Q, Q', R' and R" are selected from the group consisting of hydrogen, methyl, ethyl, phenyl, chloromethyl and hydroxymethyl, R is selected from the group consisting of $C_1$-$C_{18}$ alkyl, phenyl and alkylphenyl wherein the alkyl group contains 1–15 carbon atoms, X is selected from the group consisting of oxygen and sulfur and $n$ is a number of from 1 to about 70. These hydroxyalkyl esters may be prepared by the procedure described in copending application Ser. No. 497,521 filed of an even date herewith. By the proper choice of values for R, R', R", Q, Q' and $n$, surface coatings with widely varying properties may be obtained.

The acid anhydride employed in preparing the hydroxyalkyl ester described may be any dicarboxylic acid anhydride containing ethylenic unsaturation. Examples of such anhydrides include maleic anhydride, citraconic anhydride, itaconic anhydride and chlorendic anhydride. The preferred anhydride is maleic anhydride The acid anhydride is first reacted with a glycol ether corresponding to the formula:

R—X(CHR'CHR"O)$_n$—H wherein R, R', R", X and $n$ are as defined hereinabove. Such glycol ethers may be obtained by the reaction of an alkylene oxide with an aliphatic alcohol, phenol, alkylphenol, mercaptan, thiophenol or alkylthiophenol. Alkylene oxides that may be employed include ethylene oxide, propylene oxide, butylene oxide, styrene oxide, glycidol, epichlorohydrin, or mixtures thereof. These alkylene oxides may be added to such compounds as methanol, ethanol, butanol, tridecyl alcohol, stearyl alcohol, phenol, cresol, butylphenol, octylphenyl, nonylphenol, dodecylphenol, methyl mercaptan, ethyl mercaptan, stearyl mercaptan, thiophenol, butylthiophenol and nonylthiophenol. From 1 to about 70 mols of the epoxide may be employed per mol of alcohol, phenol, thiophenol or mercaptan.

The hydroxyalkyl ester is then prepared from this intermediate half-ester by reaction with an alkylene oxide. The alkylene oxide employed may be any of the alkylene oxides described hereinabove. It may be the same or a different alkylene oxide from that incorporated in the glycol ether.

The preferred hydroxyalkyl esters are those obtained by the reaction of the methyl, ethyl and butyl ethers of ethylene and diethylene glycol with maleic anhydride followed by treatment with ethylene or propylene oxide. In such esters A is the group —CH=CH—, X is oxygen, $n$ is 1–2, R' and R" are hydrogen, R is methyl, ethyl or butyl and Q and Q' are hydrogen when ethylene oxide is used or one of Q and Q' is hydrogen and the other is methyl when propylene oxide is used.

To prepare the surface coatings of the present invention the hydroxyalkyl ester is first copolymerized with a vinylic compound. The vinylic comonomer employed is one containing only one equivalent of ethylenic unsaturation in the molecule. Acceptable comonomers include styrene, methylstyrene and esters of ethylenically unsaturated carboxylic acids such as methyl methacrylate and butyl acrylate. We prefer to use a mixture of methyl methacrylate and styrene. This comonomer or mixture of comonomers will normally comprise from about 40 to about 90 mol percent of the copolymer composition with the hydroxyalkyl ester comprising correspondingly from about 60 to about 10 mol percent of the copolymer composition.

The copolymerization is conducted in accordance with known techniques employing a solvent mixture or solvent mixture and a peroxide catalyst. Preferred solvents are mixtures of aromatic hydrocarbons and aliphatic alcohols. Aromatic hydrocarbons that may be employed include benzene, toluene and xylene, while satisfactory aliphatic alcohols include ethanol, propanol and butanol. A preferred solvent mixture is a 50/50 mixture of xylene and butanol.

This copolymerization reaction is catalyzed by the usual peroxide catalysts. Such catalysts are well known to those skilled in the art and include, for example, cumene hydroperoxide, ditertiarybutyl peroxide and benzoyl peroxide. The catalyst will normally comprise from about 0.5 to about 5 wt. percent based on the total weight of monomers. The reaction is run at a temperature ranging from about 50° C. to the reflux temperature of the solvent mixture employed. Complete copolymerization may require from 5 to 12 hours.

The copolymers are converted to surface coatings by treatment with cross-linking agents, all in accordance with known techniques. Typical cross-linking agents are amine-formaldehyde resins such as benzoguanamine-formaldehyde, urea-formaldehyde and melamine-formaldehyde resins. We have obtained particularly good results with hexamethoxymethyl-melamine. The weight ratio of copolymer to cross-linking agent may be varied from about 60:40 to about 90:10. The preferred ratio is from about 70:30 to 80:20.

The copolymer solution and cross-linking agent are mixed with a catalyst and leveling agent in the presence of additional solvents. This solution is then applied to the surface to be coated and curing is effected by heat. The coating may be heated at a temperature within the range of from about 100° to about 300° C. for a period of time of from about one-fourth to about one hour. The coating is preferably cured at a temperature of from about 140° to about 175° C. for a period of from about 20 to about 40 minutes.

The catalyst employed is a strong acid such as, for example, phosphoric acid or p-toluene sulfonic acid. A preferred catalyst is a 20% solution of p-toluene sulfonic acid in ethylene glycol monoethyl ether acetate. The leveling agent is a surface-active agent, preferably, a polysiloxane-polyoxyalkylene block copolymer prepared in accordance with the disclosure in U.S. Patent No. 2,843,784.

The copolymer is employed in the surface coating formulation in the form of the solution in which it was prepared. Additional solvents are normally added to the formulation. The additional solvents employed may be aromatic hydrocarbons or low molecular weight aliphatic alcohols of the type employed in the polymerization reaction. The preferred solvents to be added to the surface coating formulation are glycol ethers and glycol ether esters. Such solvents include diethylene glycol monomethyl ether, diethylene glycol monobutyl ether, diethylene glycol monoethyl ether acetate and ethylene glycol monobutyl ether acetate. Pigments may be included in the formulation, all in accordance with known procedures.

The present invention will be further illustrated by the following examples.

EXAMPLE I

Copolymers were prepared in the following manner. Five hundred grams of a 50-50 xylene-butanol mixture was added to a reaction flask equipped with stirrer, thermometer, condenser and dropping funnel. The solvent mixture was heated to the reflux temperature and 500 grams of the monomer mixture containing 10 grams of cumene hydroperoxide was added from the dropping funnel over a period of two hours while maintaining the reflux temperature. The reactants were held at reflux temperature for a period of several hours to obtain complete copolymerization. The resultant polymer solutions were usually colorless with a slight haze. In all cases, the monomer mixture had the following composition.

| Component | Mol percent |
|---|---|
| Hydroxyl-containing monomer | 15 |
| Alkyl methacrylate | 25 |
| Styrene | 60 |

Two hydroxyl-containing monomers of the present invention were employed. These were hydroxypropyl methoxyethyl maleate (HPMEM) and hydroxypropyl phenoxypropyl maleate (HPPPM). For comparative purposes two prior art hydroxyl-containing monomers, hydroxypropyl methacrylate (HPMA) and hydroxyethyl methacrylate (HEMA) were also employed. The alkyl methacrylates employed in the composition were methyl methacrylate and butyl methacrylate. The properties of the methyl methacrylate copolymers are shown in Table 1 while the properties of the butyl methacrylate copolymers are shown in Table 2.

TABLE 1.—COMPOSITION AND SOLUTION PROPERTIES OF METHYL METHACRYLATE COPOLYMERS

Copolymer composition, mol percent:
Hydroxyl-containing monomer _____ 15
Methyl methacrylate _____ 25
Styrene _____ 60

| Resin containing | HPMA | HEMA | HPMEM | HPPPM |
|---|---|---|---|---|
| Conditions of Reaction: | | | | |
| Time of reaction, hrs.[1] | 7 | 7 | 12 | 12 |
| Catalyst concentration, wt. percent | 2.0 | 2.0 | 3.92 | 3.92 |
| Solution Properties: | | | | |
| Gardner viscosity | W-X | $Z_2$-$Z_3$ | R-S | M-N |
| Gardner color | <1 (haze) | <1 (sl. haze) | <1 | <1 |
| Solids content, percent by wt | 50.2 | 48.5 | 44.8 | 48.8 |
| Yield, percent by wt | 100.4 [2] | 97.0 [2] | 89.6 [2] | 97.6 [3] |

[1] Time of reaction is reported as time required for addition of monomers (2 hrs.) plus refluxing period.
[2] Precipitated into water, dried to constant weight.
[3] Precipitated into 50/50 water/methanol mixture, dried to constant weight.

TABLE 2.—COMPOSITION AND SOLUTION PROPERTIES OF BUTYL METHACRYLATE COPOLYMERS

Copolymer Composition, mol percent:
Hydroxyl-containing monomer _____ 15
Butyl methacrylate _____ 25
Styrene _____ 60

| Resin containing | HPMA | HEMA | HPMEM | HPPPM |
|---|---|---|---|---|
| Conditions of Reaction: | | | | |
| Time of reaction, hrs.[1] | 7 | 7 | 12 | 12 |
| Catalyst concentration, wt. percent | 2.0 | 2.0 | 3.92 | 3.92 |
| Solution Properties: | | | | |
| Gardner viscosity | U-V | W-X | I-J | M-N |
| Gardner color | <1 (haze) | <1 (sl. haze) | <1 (sl. haze) | <1 (sl. haze) |
| Solids content, percent by wt | 49.4 | 48.1 | 45.5 | 49.2 |
| Yield, percent by wt | 98.8 [2] | 96.2 [2] | 91.0 [2] | 98.4 [3] |

[1] Time of reaction is reported as time required for addition of monomers (2 hrs.) plus refluxing period.
[2] Precipitated into water, dried to constant weight.
[3] Precipitated into 50/50 water/methanol mixture, dried to constant weight.

It will be noted from the table that the hydroxyl-containing monomers of the present invention are more difficult to polymerize than are the prior art monomers. However, we found that suitable copolymers can be obtained by the use of additional catalyst and longer reaction times. It will also be noted that the copolymer solutions of the present invention are less viscous than those of the prior art indicating lower molecular weights. Despite these lower molecular weights excellent surface coatings were obtained when the copolymers were cross-linked.

EXAMPLE II

Clear coatings were formulated as follows using the various copolymer solutions.

| Component: | Weight, g. |
|---|---|
| Copolymer solution (approx. 50% resin solids) | 200.0 |
| Hexamethoxymethylmelamine | 20.0 |
| Catalyst [1] | 0.4 |
| Leveling agent | 4.0 |
| Diethyl glycol monomethyl ether | 200.0 |
| Diethyl glycol monoethyl ether acetate | 180.0 |

[1] A 20% solution of p-toluene sulfonic acid in ethylene glycol monoethyl ether acetate.

The coatings were applied to a 3 in. x 6 in. No. 30 gage bright dry finish coke tin plate panel and baked at 150° C. for one-half hour. The baked coatings had a thickness of about 1 mil. The coatings were tested for impact resistance and the results are reported in Table 3.

TABLE 3.—IMPACT TESTING OF CLEAR BAKED COATINGS

Copolymer Composition, mol percent:
Hydroxyl-containing monomer .................... 15
Methyl methacrylate ............................. 25
Styrene ......................................... 60

| | Hydroxyl-containing monomer | | | |
|---|---|---|---|---|
| | HPMA | HEMA | HPMEM | HPPPM |
| Front impact, in.-lb. to fail | 10 | 22 | 80 | <2 |
| Reverse impact, in.-lb. to fail | 4 | 22 | 80 | <2 |

Copolymer Composition, mol percent:
Hydroxyl-containing monomer .................... 15
Butyl methacrylate .............................. 25
Styrene ......................................... 60

| | Hydroxyl-containing monomer | | | |
|---|---|---|---|---|
| | HPMA | HEMA | HPMEM | HPPPM |
| Front impact, in.-lb. to fail | 30 | 22 | 100 | 4 |
| Reverse impact, in.-lb. to fail | 24 | 22 | 84 | <2 |

It can be seen that a wide variation in impact resistance can be obtained using hydroxyl-containing monomers of the present invention. The resin containing hydroxypropyl methoxyethyl maleate was quite flexible and had high impact resistance whereas the coating containing hydroxypropyl phenoxypropyl maleate was rigid and had low impact resistance.

We claim:
1. In a method for the preparation of a thermosetting enamel by cross-linking a copolymer by heating with an amino-formaldehyde resin, said copolymer being prepared from a hydroxyalkyl ester of an unsaturated acid and at least one ethylenically unsaturated compound, the improvement wherein the hydroxyalkyl ester is one having the formula:

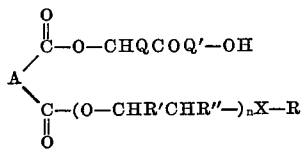

wherein A represents the nucleus of an ethylenically unsaturated dicarboxylic acid, Q, Q', R' and R" are selected from the group consisting of hydrogen, methyl, ethyl, phenyl, chloromethyl and hydroxymethyl, R is selected from the group consisting of $C_1$–$C_{18}$ alkyl, phenyl and alkylphenyl wherein the alkyl group contains from 1 to 15 carbon atoms, X is selected from the group consisting of oxygen and sulfur and $n$ is a number of from 1 to about 70.

2. A method as in claim 1 wherein A is the group —CH=CH—, X is oxygen, $n$ is 1–2, R is methyl, R' and R" are hydrogen, one of Q and Q' is hydrogen and the other of Q and Q' is methyl.

3. A method as in claim 2 wherein both Q and Q' are hydrogen.

4. A method as in claim 2 wherein R is ethyl.

5. A method as in claim 4 wherein both Q and Q' are hydrogen.

6. A method as in claim 2 wherein R is butyl.

7. A method as in claim 6 wherein both Q and Q' are hydrogen.

8. A product prepared by the method of claim 1.

References Cited

UNITED STATES PATENTS 3,207,718   9/1965   Zimmerman et al. ...... 260—78.5
3,270,088   8/1966   Hicks ................. 260—851
3,375,227   3/1968   Hicks ................. 260—851

MURRAY TILLMAN, *Primary Examiner.*

J. C. BLEUTGE, *Assistant Examiner.*